United States Patent
Newell et al.

(10) Patent No.: US 9,668,095 B1
(45) Date of Patent: May 30, 2017

(54) SYSTEMS AND METHODS FOR SUPPORTING ZONES IN A MONITORING SYSTEM

(71) Applicant: BI Incorporated, Boulder, CO (US)

(72) Inventors: Joseph P. Newell, Louisville, CO (US); James J. Jr. Buck, Longmont, CO (US)

(73) Assignee: BI Incorporated, Boulder, CO (US)

( * ) Notice: Subject to any disclaimer, the term of this patent is extended or adjusted under 35 U.S.C. 154(b) by 600 days.

(21) Appl. No.: 13/919,862

(22) Filed: Jun. 17, 2013

Related U.S. Application Data

(60) Provisional application No. 61/670,094, filed on Jul. 10, 2012.

(51) Int. Cl.
*H04W 24/00* (2009.01)
*H04W 4/02* (2009.01)

(52) U.S. Cl.
CPC .................................. *H04W 4/021* (2013.01)

(58) Field of Classification Search
CPC ........... H04W 4/02; H04W 4/22; H04W 4/04; H04W 8/02; H04W 8/08; H04W 8/16; H04W 8/10; H04W 60/04; H04W 64/00
USPC ........................ 455/456.1; 340/539.13, 573.4
See application file for complete search history.

(56) References Cited

U.S. PATENT DOCUMENTS

| | | | |
|---|---|---|---|
| 7,015,817 B2* | 3/2006 | Copley et al. | 340/573.4 |
| 7,930,927 B2 | 4/2011 | Cooper et al. | |
| 8,493,219 B2 | 7/2013 | Buck et al. | |
| 8,576,065 B2 | 11/2013 | Buck et al. | |
| 8,629,776 B2 | 1/2014 | Buck et al. | |
| 8,657,744 B2 | 2/2014 | Rompa et al. | |
| 8,956,231 B2* | 2/2015 | Amaitis | G07F 17/3237 463/39 |
| 9,043,137 B2* | 5/2015 | Irie | G01C 21/3667 701/430 |
| 9,240,118 B2 | 1/2016 | Melton | |
| 9,241,659 B2 | 1/2016 | Rompa et al. | |
| 2010/0123589 A1* | 5/2010 | Buck et al. | 340/573.4 |
| 2011/0154887 A1 | 6/2011 | Cooper et al. | |
| 2013/0006066 A1 | 1/2013 | Melton | |
| 2015/0048948 A1 | 2/2015 | Buck et al. | |
| 2015/0061864 A1 | 3/2015 | Buck et al. | |
| 2015/0078622 A1 | 3/2015 | Buck et al. | |
| 2015/0131085 A1 | 5/2015 | Cooper et al. | |
| 2015/0228184 A1 | 8/2015 | Buck et al. | |
| 2015/0279200 A1 | 10/2015 | Buck et al. | |
| 2015/0327214 A1 | 11/2015 | Buck et al. | |

OTHER PUBLICATIONS

U.S. Appl. No. 14/966,135, filed Dec. 11, 2015, Donald A. Melton.

* cited by examiner

*Primary Examiner* — Amancio Gonzalez
(74) *Attorney, Agent, or Firm* — Hamilton, DeSanctis & Cha

(57) ABSTRACT

Various embodiments of the present invention provide systems and method for adaptive monitoring of physical movement.

21 Claims, 12 Drawing Sheets

SYSTEMS AND METHODS FOR SUPPORTING ZONES IN A MONITORING SYSTEM

CROSS REFERENCE TO RELATED APPLICATION

The present application claims priority to (i.e., is a non-provisional of) U.S. Pat. App. No. 61/670,094 entitled "Systems and Methods for Supporting Zones in an Offender Tracking System", and filed Jul. 10, 2012 by Newell et al. The entirety of the aforementioned application is incorporated herein by reference for all purposes.

BACKGROUND OF THE INVENTION

The present invention is related to monitoring movement, and in particular to systems and methods for monitoring.

Large numbers of individuals are currently housed in prisons. This represents a significant cost to society both in terms of housing expense and wasted productivity. To address this concern, house arrest systems have been developed for use by less violent offenders. This allows the less violent offender to be monitored outside of a traditional prison system and allows the offender an opportunity to work and interact to at least some degree in society. The same approach is applied to paroled prisoners allowing for a monitored transition between a prison atmosphere and returning to society. In some cases, some individuals under house arrest may be permitted to range over a large physical area, and are only precluded from entering certain specifically defined regions. In some cases, determining which specifically defined region over a large region has been entered by a monitored individual is either not possible or expensive.

Thus, for at least the aforementioned reasons, there exists a need in the art for more advanced approaches, devices and systems for monitoring.

BRIEF SUMMARY OF THE INVENTION

The present invention is related to monitoring movement, and in particular to systems and methods for monitoring.

Various embodiments of the present invention provide monitoring systems that include: a monitoring device associated with a monitor target where the monitor target is prohibited from entering areas identified as a zone type; and a database operable to store a number of zones, wherein the zones are of at least the zone type. The system is operable to: receive a first location of the monitoring device; identify a first subset of the number of zones of the zone type based upon the first location; store the first subset to the monitoring device; receive a second location of the monitoring device; identify a second subset of the number of zones of the zone type based upon the second location; and store the second subset to the monitoring device at least in part in place of the first subset.

This summary provides only a general outline of some embodiments according to the present invention. Many other objects, features, advantages and other embodiments of the present invention will become more fully apparent from the following detailed description, the appended claims and the accompanying drawings and figures.

BRIEF DESCRIPTION OF THE DRAWINGS

A further understanding of the various embodiments of the present invention may be realized by reference to the figures which are described in remaining portions of the specification. In the figures, similar reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
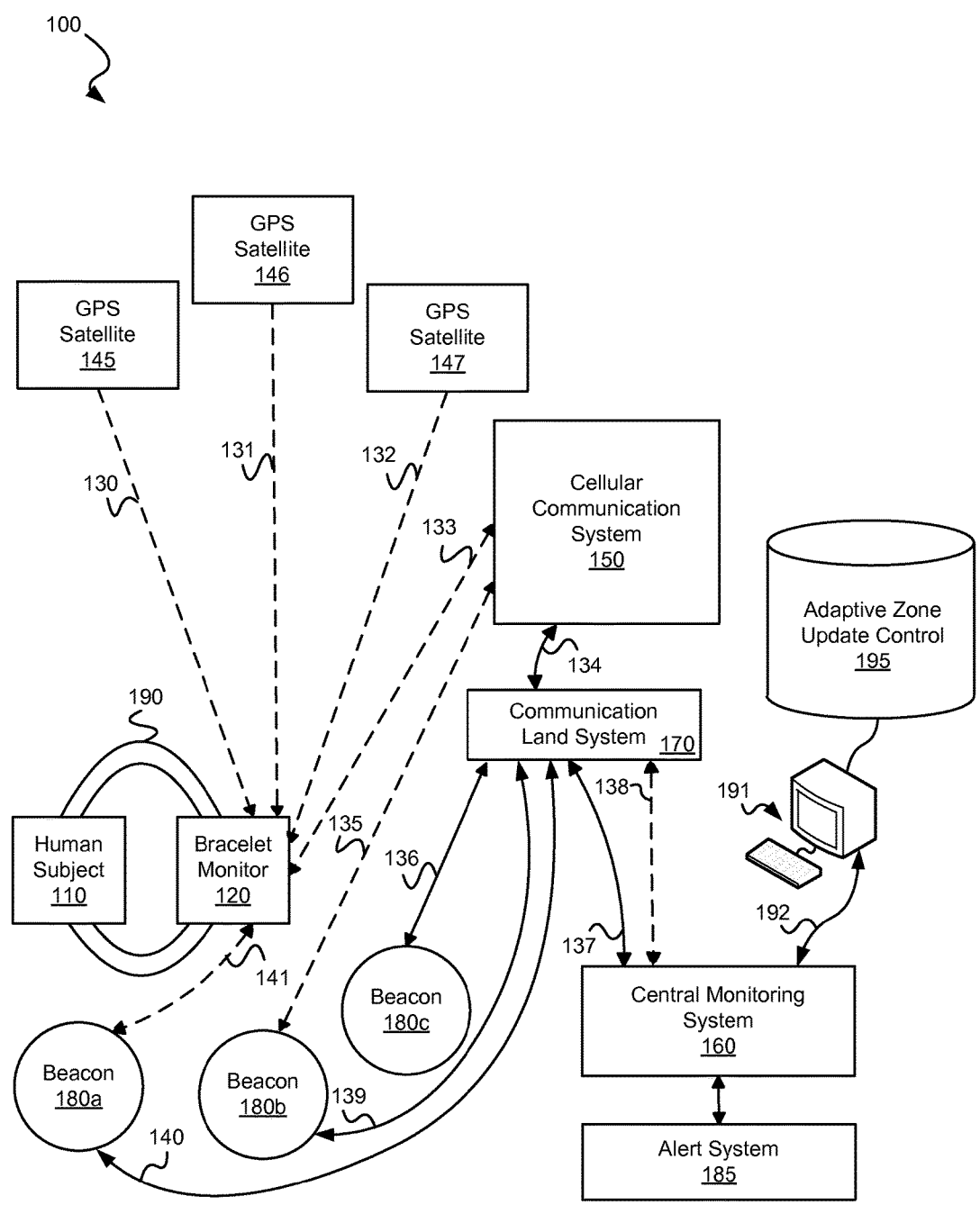
FIG. 1 is a block diagram illustrating a monitoring system including adaptive zone updating in accordance with various embodiments of the present invention.

The present invention is related to monitoring movement, and in particular to systems and methods for monitoring.

Various embodiments of the present invention provide for tracking or monitoring an individual, animal or object. As used herein, the phrase "target" is used in its broadest sense to mean any individual, animal or object. The embodiments provide an ability for determining whether a monitoring device and therefore a monitoring target, has entered into a prohibited zone over a wide area while limiting the memory and processing required to make the determination. Such embodiments allow for updating of prohibited zones on an automated basis based upon, for example a location of the monitoring device, a speed and direction of a monitoring device, a time since the monitoring device was last updated, or other trigger.

Various embodiments of the present invention provide monitoring systems that include: a monitoring device associated with a monitor target where the monitor target is prohibited from entering areas identified as a zone type; and a database operable to store a number of zones, wherein the zones are of at least the zone type. The system is operable to: receive a first location of the monitoring device; identify a first subset of the number of zones of the zone type based upon the first location; store the first subset to the monitoring device; receive a second location of the monitoring device; identify a second subset of the number of zones of the zone type based upon the second location; and store the second subset to the monitoring device at least in part in place of the first subset. In some instances of the aforementioned embodiments, the monitor target is a human. In some cases, the monitoring device includes a strap operable to attach the monitoring device to the human using a strap.

In various instances of the aforementioned embodiments where the zone type is a first zone type, the number of zones further includes a second zone type and a third zone type. The monitor target is prohibited from entering areas identified as the second zone type, but the monitor target is allowed to enter areas identified as the third zone type. In some such cases, the system is further operable to: identify a third subset of the number of zones of the second zone type based upon the first location; store the third subset to the monitoring device in addition to the first subset; receive a second location of the monitoring device; identify a fourth subset of the number of zones of the zone type based upon the second location; and store the fourth subset to the monitoring device at least in part in place of the third subset.

In some instances of the aforementioned embodiments, the monitoring system further includes a central system. The central system is operable to: receive the first location of the monitoring device; identify the first subset of the number of zones of the zone type based upon the first location; transfer the first subset to the monitoring device; receive the second location of the monitoring device; identify a second subset of the number of zones of the zone type based upon the second location; and transfer the second subset to the monitoring device. In one or more instances of the aforementioned embodiments, the present invention is further operable to: receive a direction of the monitoring device corresponding to the first location. In such instances, identifying the first subset is based both upon the first location and the direction. In particular instances of the aforementioned embodiments, the monitoring system is further operable to receive a velocity of the monitoring device. In such instances, the second subset is based both upon the second location and the velocity. In some instances of the aforementioned embodiments, the number of zones in the first subset is the same as a number of zones in the second subset. In various instances of the aforementioned embodiments, an area including the number of zones in the first subset is different than an area including the number of zones in the second subset. In some instances of the aforementioned embodiments, an area including the first subset is the same size as an area including the second subset.

In one or more instances of the aforementioned embodiments, the monitoring device is operable to: identify a third location of the monitoring device; determine that the third location is within an area identified in the first subset; and provide an alarm based upon the monitoring device being within the area. In various instances of the aforementioned embodiments, providing the alarm includes performing an operation selected from a group consisting of: transmitting an alarm to a central monitoring system, and issuing an audible alarm to the monitor target.

Other embodiments of the present invention provide monitoring devices that include: a location monitoring system, a connection device, and a prohibited zone monitoring system. The location monitoring system is operable to indicate movement of the monitoring device to a central monitor. The connection device is operable to attach to a human monitor target. The prohibited zone monitoring system operable to: receive a first location from the location monitoring system and a second location from the location monitoring system; determine whether the first location is within a first subset of zones where the first subset of zones indicates a first set of prohibited zones determined based upon a third location and stored by the prohibited zone monitoring system; and determine whether the second location is within a second subset of zones where the second subset of zones indicates a second set of prohibited zones determined based upon a fourth location and stored by the prohibited zone monitoring system at least in part in place of the first subset of zones.

In some instances of the aforementioned embodiments, the location monitoring system is further operable to determine a direction corresponding to the third location, and wherein the first set of prohibited zones determined based upon both the direction and the third location. In various instances of the aforementioned embodiments, the location monitoring system is further operable to determine a velocity of the monitoring where the first set of prohibited zones determined based upon both the velocity and the third location. In particular instances of the aforementioned embodiments, a number of zones in the first subset is the same as a number of zones in the second subset. In some such cases, an area including the number of zones in the first subset is different than an area including the number of zones in the second subset. In some instances of the aforementioned embodiments, an area including the first subset is the same size as an area including the second subset.

Yet other embodiments of the present invention provide methods for prohibited zone monitoring. The methods include: receiving a first location of a monitoring device; receiving a second location of the monitoring device; storing a number of zones where the zones are of at least a zone type and the monitoring device is prohibited from entering an area of the zone type; identifying a first subset of the number of zones of the zone type based upon the first location; storing the first subset to the monitoring device; identifying a second subset of the number of zones of the zone type based upon the second location; and storing the second subset to the monitoring device at least in part in place of the first subset.

Turning to FIG. 1, a monitoring system 100 including adaptive zone updating is depicted in accordance with various embodiments of the present invention. Monitoring system 100 may be tailored for tracking human subjects, however, it should be noted that various implementations and deployments of monitoring system 100 may be tailored for tracking non-human targets such as, for example, other animals or inanimate assets or objects. Such inanimate assets or objects may include, but are not limited to, automobiles, boats, equipment, shipping containers or the like. In one particular embodiment, monitoring system 100 is tailored for tracking delivery vehicles. Based upon the disclosure provided herein, one of ordinary skill in the art will recognize a variety of individuals, animals and/or assets that may be monitored in accordance with different embodiments of the present invention, and/or different monitoring scenarios or systems that may be modified to incorporate one or more features disclosed herein.

Monitoring system 100 includes, but is not limited to, a bracelet monitor 120 that is physically coupled to a human subject 110 by a securing device 190. In some cases, securing device 190 is a strap that includes a continuity sensor that when broken indicates an error or tamper condition. Further, in some cases, bracelet monitor 120 includes a proximity sensor that is able to detect when it has been moved away from an individual being monitored. When such movement away from the individual is detected, an error or tamper condition may be indicated. Based on the disclosure provided herein, one of ordinary skill in the art will recognize a variety of tamper sensors that may be incorporated in either bracelet monitor 120 or securing device 190 to allow for detection of removal of bracelet monitor 120 or other improper or unexpected meddling with bracelet monitor 120. Further, based upon the disclosure provided herein, one of ordinary skill in the art will recognize a variety of monitors and/or securing devices that may be appropriate where the target of the monitoring is not a human or other animal subject, but rather an asset.

Bracelet monitor 120 is designed to provide the location of human subject 110 under a number of conditions. For example, when bracelet monitor 120 is capable of receiving wireless GPS location information 130, 131, 132 from a sufficient number of GPS satellites 145, 146, 147 respectively, bracelet monitor 120 may use the received wireless GPS location information to calculate or otherwise determine the location of human subject 110. Alternatively or in addition, the location of a beacon 180 that is local to bracelet monitor 120 may be used as the location of bracelet monitor 120. As yet another alternative, an AFLT fix may be established based on cellular communication with bracelet monitor 120. It should be noted that other types of earth based triangulation may be used in accordance with different embodiments of the present invention. For example, other cell phone based triangulation, UHF band triangulation such as Rosum, Wimax frequency based triangulation, S-5 based triangulation based on spread spectrum 900 MHz frequency signals. Based on the disclosure provided herein, one of ordinary skill in the art will recognize other types of earth based triangulation that may be used.

As yet another alternative, an AFLT fix may be established based on cellular communications between bracelet monitor 120 and a cellular communication system 150. Furthermore, when wireless communication link 133 between bracelet monitor 120 and cellular communications system 150 is periodically established, at those times, bracelet monitor 120 may report status and other stored records including location fixes to a central monitoring system 160 via wireless communication link 138.

Monitoring system 100 includes, but is not limited to, at least one beacon 180. Beacons 180 are instrumental for beacon based monitoring systems. Within FIG. 1, a telemetric wireless link 141 has been depicted between beacon 180a and bracelet monitor 120. Each beacon 180 has an adjustable range to make telemetric wireless contact with bracelet monitor 120. At any point in time, depending on each beacon's 180 relative distance to bracelet monitor 120, none, one, or more than one tracking beacons 180 may be within transmission range of a single bracelet monitor 120. Likewise, it is further conceivable under various circumstances that more than one bracelet monitor 120 at times be within in range of a solitary beacon 180.

Telemetric wireless communications path 141 established at times between tracking beacon 180a and bracelet monitor 120 illustrates a common feature of various different embodiments of the current invention. Some embodiments of the various inventions vary on how, i.e. protocol, and what information and/or signaling is passed over wireless link 141. For example, in more simplified configurations and embodiments, each beacon 180 is limited to repetitively transmitting its own beacon ID and physical location information. In that way, once bracelet monitor 120 is within transmission range of tracking beacon 180a and establishes wireless or wired reception 141, then bracelet monitor 120 can record and store received beacon ID and location information. At a later time, for some embodiments of the present invention, bracelet monitor 120 can then report recorded readings from beacons 180 to the central monitoring system 160 over the cellular communication system 150 using wireless links 133 and 138 as depicted in FIG. 1. Furthermore, many embodiments allow for such transmissions and information passing to occur without being noticed by human subject 110, and unnoticed, automatically, and near effortlessly central monitoring system 160 is able to establish records and track human subject's 110 movements and whereabouts.

In other embodiments or configurations according to the present invention, each beacon 180 also transmit status information related to its own device health and information related from each beacon's 180 internal tampering, movement, or other sensors via a communication system 170 to central monitoring system 160. This allows for detection of movement of beacons 180, and establishing some level of confidence that the location reported by each of beacons 180 is accurate. Various other details about a beacon based system are disclosed in U.S. patent application Ser. No. 12/041,746 entitled "Beacon Based Tracking Devices and Methods for Using Such" and filed Mar. 4, 2008 by Buck et al. The entirety of the aforementioned reference is incorporated herein by reference for all purposes.

Likewise, in some other embodiments, each bracelet monitor 120 contains a host of their own tampering, shielding, movement, and/or other sensors related to its own device health. While still further embodiments also include a host of other measurement transducers within bracelet monitor 120 for extracting information, and for later reporting, related to physical properties of human subject 110. For example, measuring for the presence of alcohol and/or other drugs present in human subject 110 may be included in some embodiments of bracelet monitor 120. As one example, the alcohol sensor discussed in U.S. patent application Ser. No. 12/041,765 entitled "Transdermal Portable Alcohol Monitor and Methods for Using Such" and filed by Cooper et al. on Mar. 4, 2008. The entirety of the aforementioned reference is incorporated herein by reference for all purposes.

Beacons 180 in alternative embodiments of the present invention may communicate with central monitoring system 160 independently of bracelet monitor 120. The monitoring system 100 illustrated in FIG. 1 shows beacon 180b having both a wireless communication link 135 with cellular communication system 150, and also illustrates beacon 180b having a hardwired communication link 139 with land communication system 170. Monitoring system 100 is also shown with beacons 180a, 180b, and 180c each having hardwired land communication links 140, 139, and 136 respectively to land communication system 170. Monitoring system 100 further illustrates land communication system 170 having a hardwired communication link 134 to cellular communication system 150, and a hardwired communication link 137 to central monitoring system 160.

In some embodiments of the present invention, beacons 180 are located in areas frequented by human subject 110 where bracelet monitor 120 is incapable of accessing information from the GPS system. Such beacons eliminate the need to perform an AFLT fix and avoid the costs associated therewith. As an example, human subject 110 may have a tracking beacon 180 placed within his home, and one also placed at his place of employment in close proximity to his work area. In this way, the two placed beacons, each at different prescribed times, can interact with his attached bracelet monitor 120 to periodically make reports to central monitoring system 160 to track movements and the whereabouts of human subject 110. All this can be done without incurring the costs associated with performing an AFLT fix.

Monitoring system 100 further includes a control station 191 that is communicably coupled to central monitoring system 160 via a communication link 192. In one particular embodiment of the present invention, control station 191 is a personal computer including a display device, a processor, and/or one or more I/O devices. Based upon the disclosure provided herein, one of ordinary skill in the art will recognize a variety of systems that may be used as control station 191. A storage medium 195 is communicably coupled to control station 191 and maintains instructions governing the operation of adaptive zone update control.

Central monitoring system 160 includes functionality for sending alerts to an alert system 185 when a tracked target ventures into a prohibited zone as updated by the adaptive zone update control. Various implementations of the adaptive zone update control are more fully described below in relation to FIGS. 2-6. Such an alert recipient system 185 may be, but is not limited to, a law enforcement computer deployed at a dispatch station of the law enforcement facility or a hand held computer maintained by a law enforcement official. Based upon the disclosure provided herein, one of ordinary skill in the art will recognize a variety of alert recipient systems 185 that may be used in relation to one or more of the embodiments discussed herein.

Figure 2:
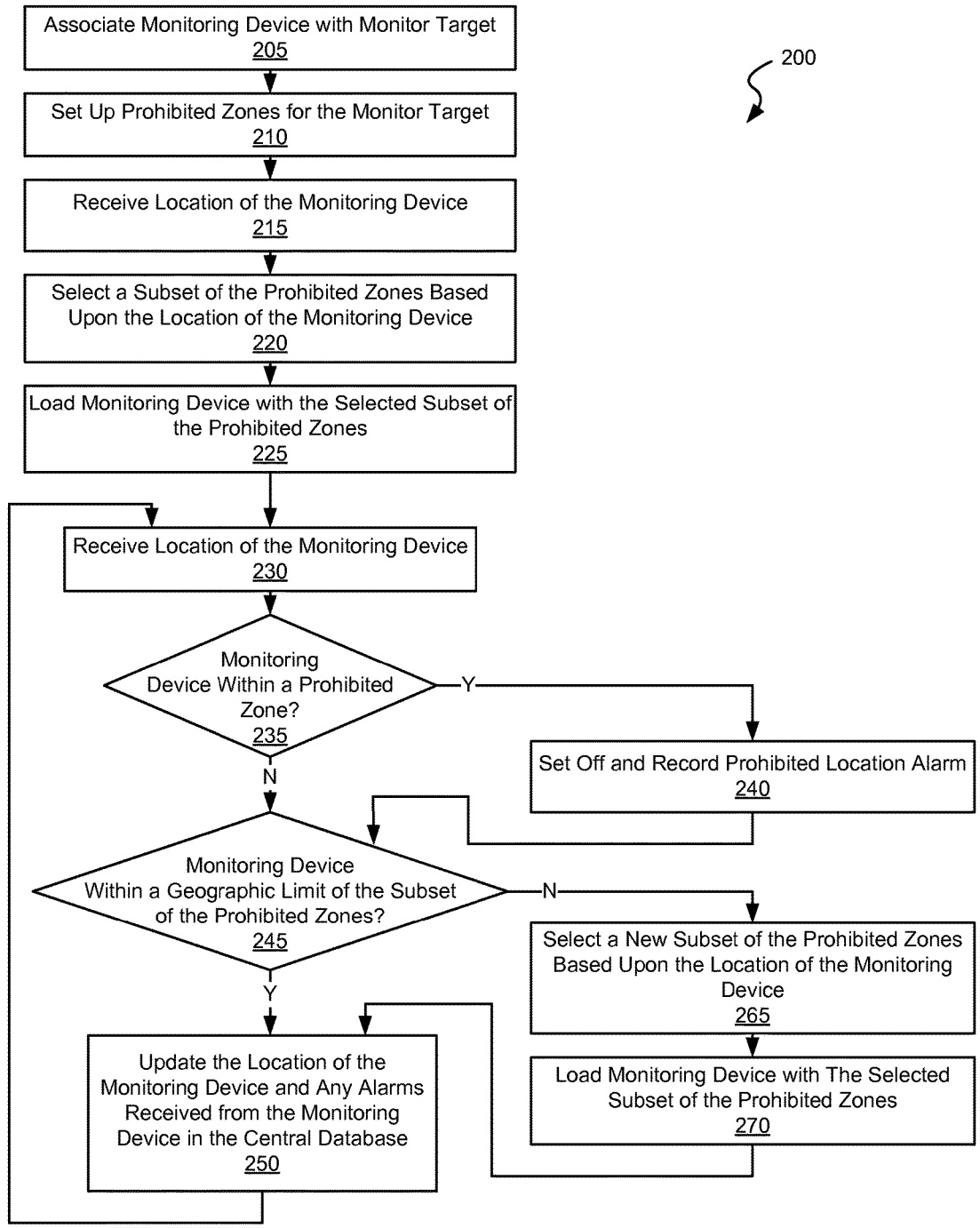
FIG. 2 is a flow diagram depicting a method for adaptive zone updating in accordance with some embodiments of the present invention.

Turning to FIG. 2, a flow diagram 200 depicts a method for adaptive zone updating in accordance with various embodiments of the present invention. Following flow diagram 200, a monitor device is associated with a monitor target (block 205). Where the monitor target is a human subject, associating the monitor device with the monitor target may include placing the monitor device in a pouch maintained by the human subject or physically attaching the monitoring device to the human subject using, for example, a strap or bracelet. Alternatively, where the monitor target is a non-human asset, associating the monitor device with the monitor target may include placing the monitor device inside the target or otherwise attaching the monitor device to the target. Based upon the disclosure provided herein, one of ordinary skill in the art will appreciate a variety of ways that a monitor device may be associated with a target.

Figure 3A:
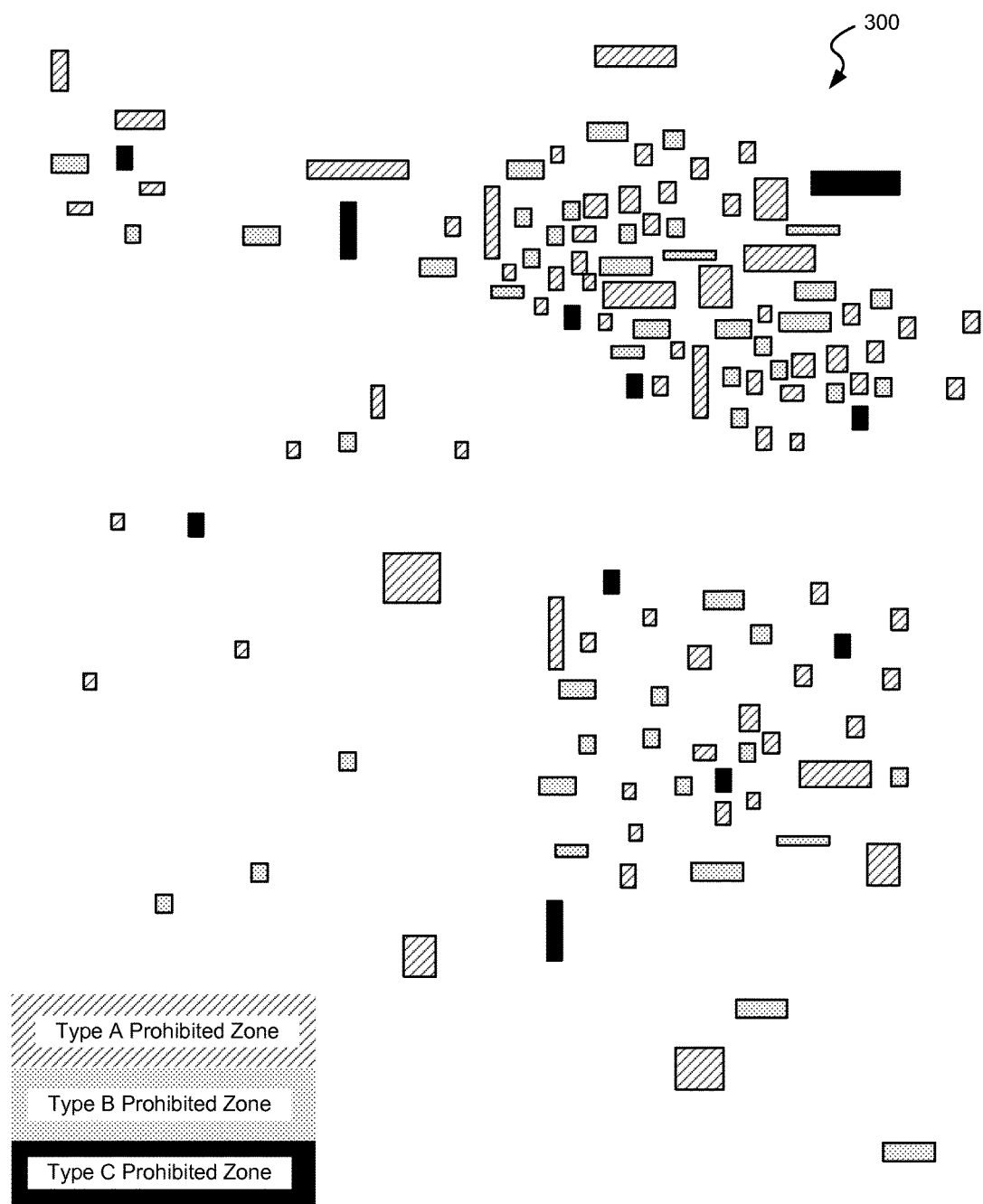
FIGS. 3a-3d provide an example graphical depiction of the method of FIG. 2.

A set of zones or areas into which the target may go is set up (block 210). The prohibited zones may be identified in a number of ways. For example, the prohibited zones may be identified as two opposing corners of a rectangle or a center point and radius of a circle. Based upon the disclosure provided herein, one of ordinary skill in the recognize other approaches that may be used for identifying the boundaries of a prohibited zone. The universe of prohibited zones may be developed, for example, by local area officials to identify the location of different types of zones in a region that they operate. In turn, zone information from a number of local regions may be assembled in a common database to make a wider area map of zones. Turning to FIG. 3a, an example zone map 300 is shown that includes a number of classified zones represented as rectangles. In particular, zone map 300 shows three different types of zones: type A zones shown with crosshatching, type B zones shown with stippling, and type C zones shown as solid black.

Figure 3B:
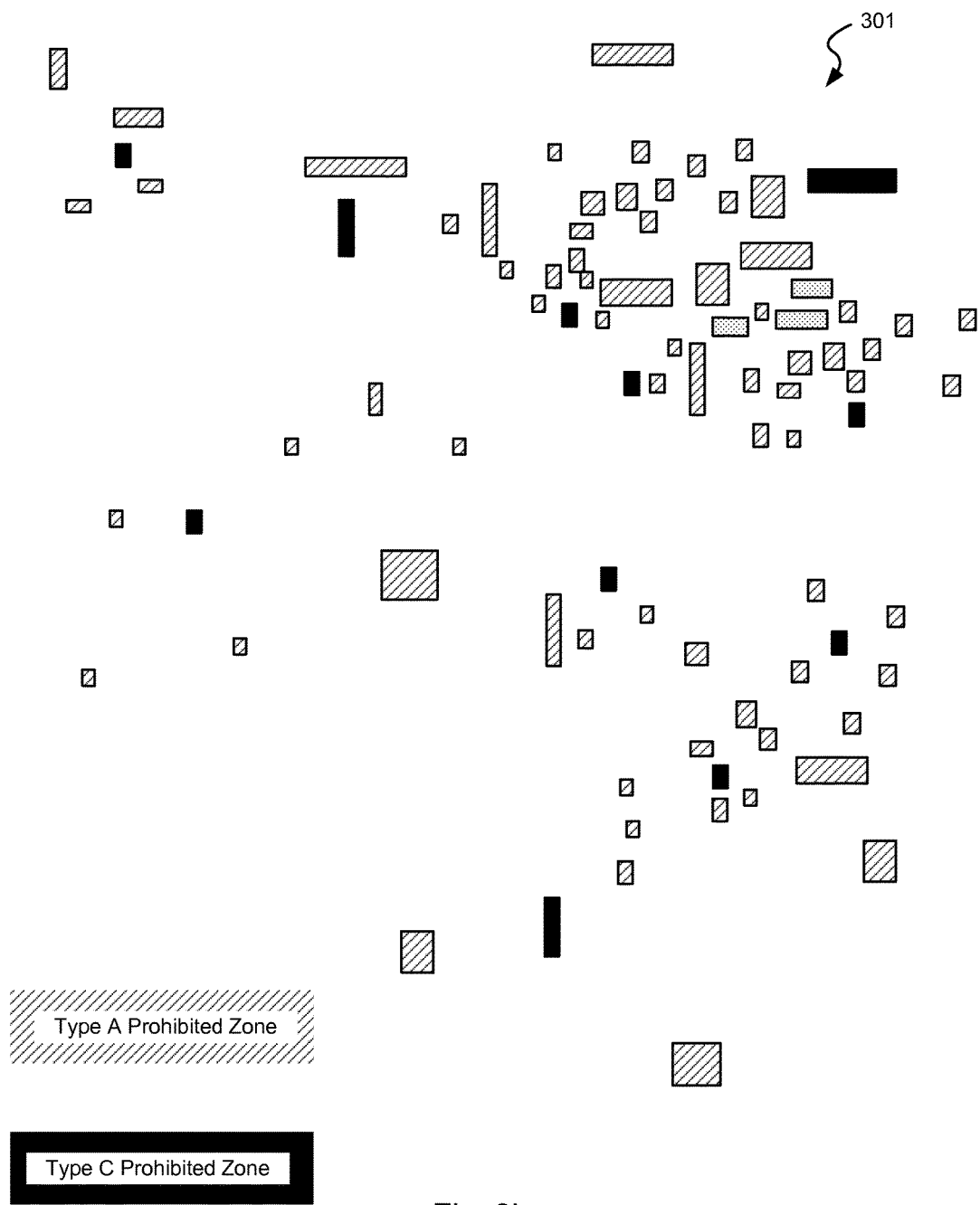

A target may be allowed into some types of zones, but not into other types of zones. Thus, the process of block 210 includes selecting which types of zones a given target may enter. As an example, where the target has been convicted of child abuse, they may be prohibited from entering zones identified as schools. As another example, where the target is an alcoholic, they may be prohibited from entering zones where alcohol is dispensed or sold. As yet another example, where the target is an automobile, it may be prohibited from going onto freeways or into residential areas. Based upon the disclosure provided herein, one of ordinary skill in the art will recognize a variety of types of areas that may be identified, and the target may be selectively prohibited from entering one or more types of zones. Turning to FIG. 3b, where a target is allowed to enter type B zones, but not type A zones or type C zones, all type B zones are removed from zone map 300 to yield zone map 301. As such, zone map 301 represents the universe of zones where the target is prohibited from entering as an example of the results of the process performed in block 210.

Figure 3C:
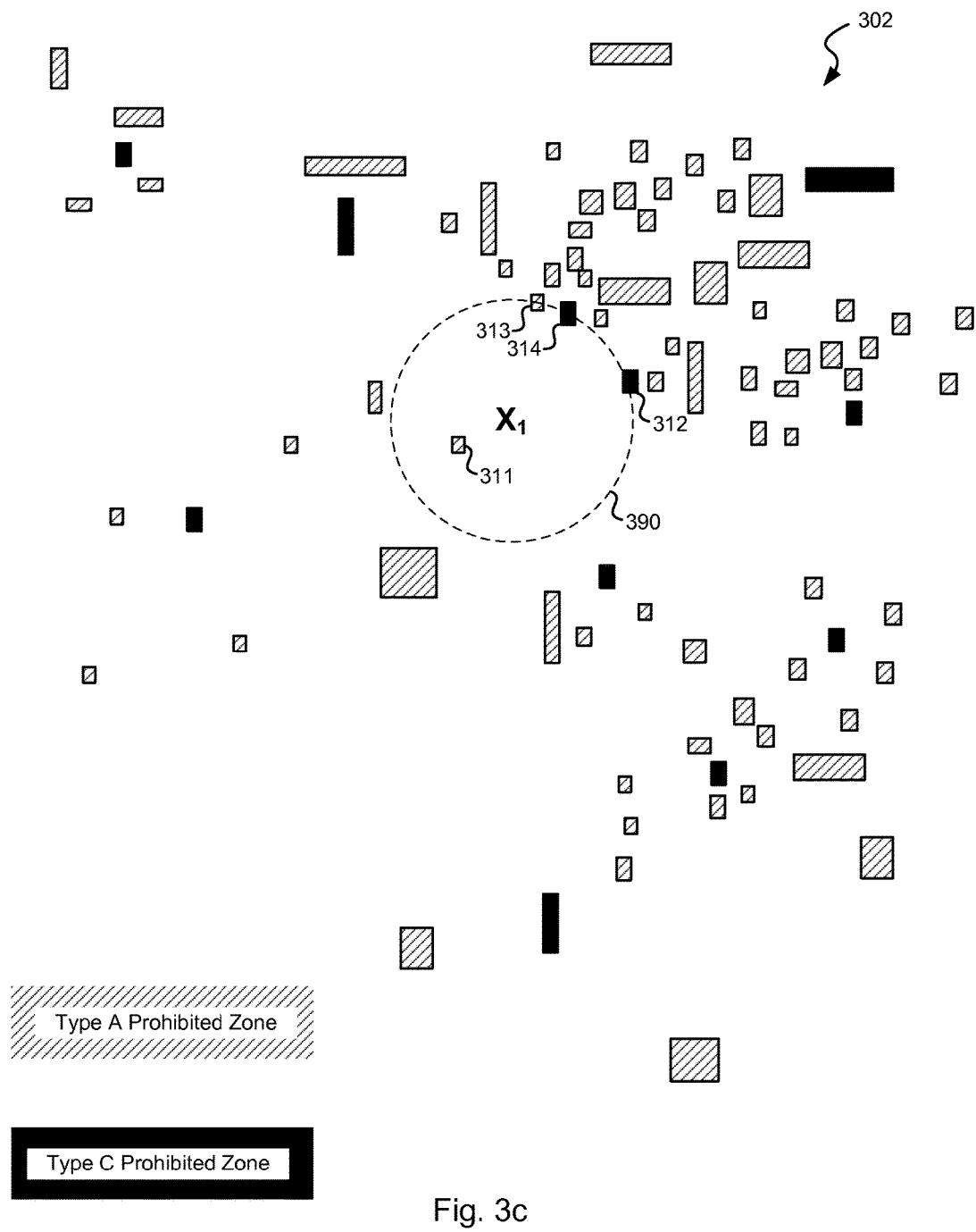

Referring again to FIG. 2, a location of the monitoring device is received (block 215). In some cases, the location is received by control station 191. As discussed above in relation to FIG. 1, the location may be based upon satellite information or beacon information. The received location is used to fix the position of the monitoring device (and associated target) relative to the prohibited zones identified in block 210 and based upon this relative location of the monitoring device to the identified prohibited zones, a subset of the prohibited zones is selected for the monitoring device (block 220). In some cases where the location is received by control station 191, control station 191, using instructions from accessed from storage medium 195 identifies the selected subset of prohibited zones. As an example, only zones within an area around the location of the monitoring device are included in the subset of prohibited zones. The size of the area around the location may be fixed or programmable depending upon the particular implementation. Turning to FIG. 3c, the location of the monitoring device is identified as $X_1$, and the area around the location of the monitoring device is a circle 390. As shown, four prohibited zones are at least partially included in circle 390 (a prohibited zone 311 of type A, a prohibited zone 312 of type C, a prohibited zone 313 of type B, and a prohibited zone 314 of type C). In this example, the selected subset of prohibited zones identified using the process of block 220 include prohibited zones 311, 312, 313, 314. Referring again to FIG. 2, the selected subset of prohibited zones is loaded into the monitoring device (block 225). This may include, for example, communicating a load prohibited zones message from control station 191 to the monitoring device. At this point, the monitoring device is initialized for operation.

During post initialization, a location of the monitoring device is again received (block 230). In addition, the monitoring device takes the location information that is being reported to the central monitor and determines whether the monitoring device has moved into a prohibited zone (i.e., one of the subset of the prohibited zones) (block 235). Where the monitoring device determines that it is within a prohibited zone (block 235), the monitoring device communicates this information by setting off and recording a prohibited zone alarm (block 240). This alarm may be, for example, an audible communication to an individual associated with the monitoring device giving instructions on a direction to travel to move outside of the prohibited zone. Based upon the disclosure provided herein, one of ordinary skill in the art will recognize a variety of alarms that may be implemented in relation to different embodiments of the present invention.

Figure 3D:
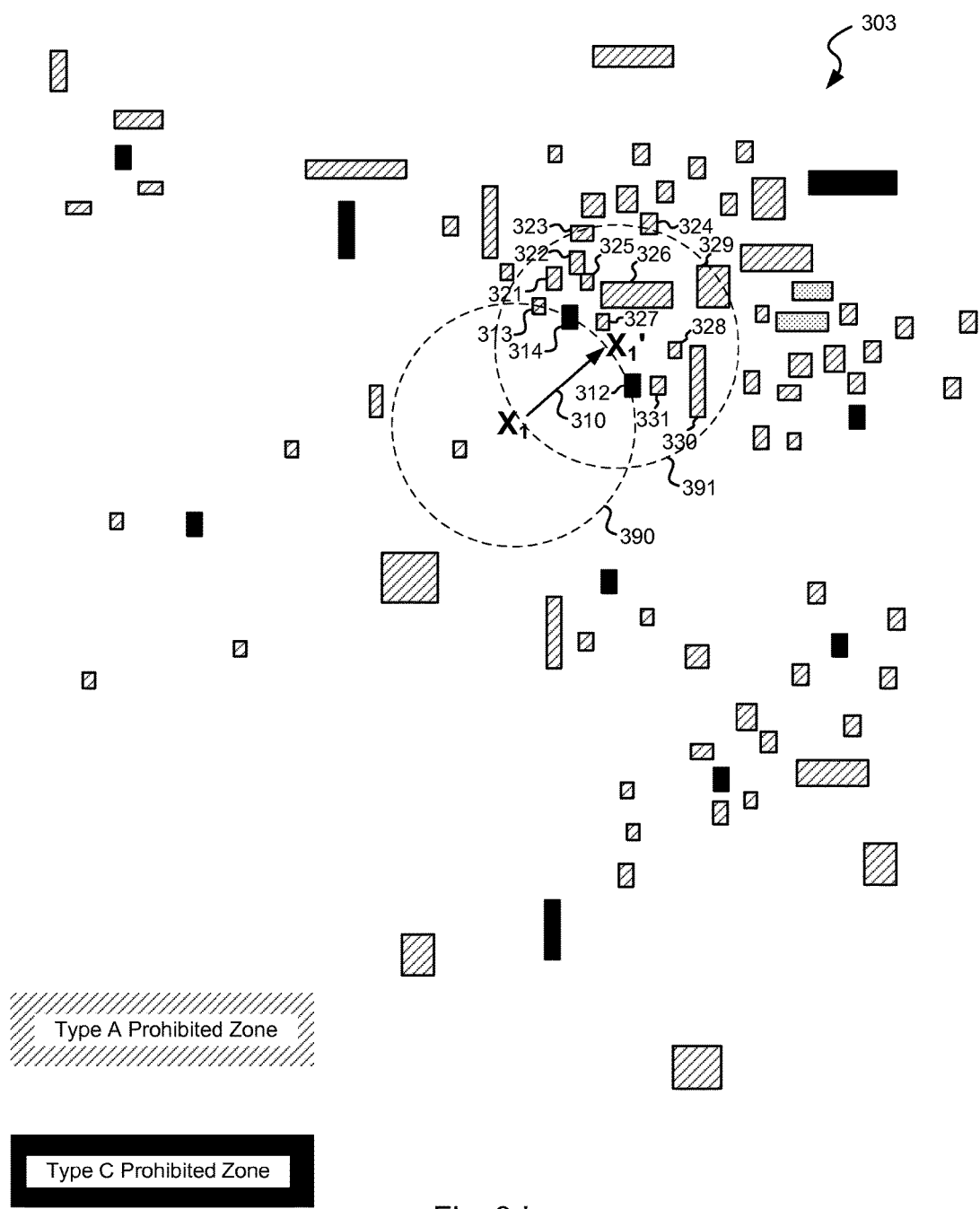

It is then determined whether the monitoring device is within a geographic limit corresponding to the current subset of prohibited zones (block 245). This may be done, for example, by control station 191 comparing the movement of the monitoring device against the area represented by the last uploaded subset of prohibited zones. Where the location is nearing the boundary of the previously loaded area (block 245), a new subset of the prohibited zones based upon the current location of the monitoring device is determined (block 265). This may be done, for example, by control station 191. In such a case, control station 191, using instructions from accessed from storage medium 195, identifies the selected subset of prohibited zones. As an example, only zones within an area around the updated location of the monitoring device are included in the subset of prohibited zones. Turning to FIG. 3d, the location of the monitoring device is identified as $X_1'$ and the area around the location of the monitoring device is a circle 391. Of note, $X_1'$ is near the boundary of circle 390 from which the previous subset of the prohibited zones was based. As shown, fourteen prohibited zones are at least partially included in circle 391 (prohibited zone 312 of type C, prohibited zone 313 of type B, prohibited zone 314 of type C, a prohibited zone 321 of type A, a prohibited zone 322 of type A, a prohibited zone 323 of type A, a prohibited zone 324 of type A, a prohibited zone 325 of type A, a prohibited zone 326 of type A, a prohibited zone 327 of type A, a prohibited zone 328 of type A, a prohibited zone 329 of type A, a prohibited zone 330 of type A, and a prohibited zone 331 of type A). In this example, the selected subset of prohibited zones identified using the process of block 265 include prohibited zones 312, 313, 314, 321, 322, 323, 324, 325, 326, 327, 328, 329, 330, 331. Referring again to FIG. 2, the newly selected subset of prohibited zones is loaded into the monitoring device (block 270). This may include, for example, communicating a load prohibited zones message from control station 191 to the monitoring device.

The location of the monitoring device and any alarms from the monitoring device are updated in the central memory (block 250). This may be done, for example, by central monitoring system 160, and where any alerts are desired (e.g., a violation of a prohibited zone) they are provided to alert system 185. At this juncture, the processes of blocks 230-270 are repeated for the next reported location of the monitoring device.

Figure 4:
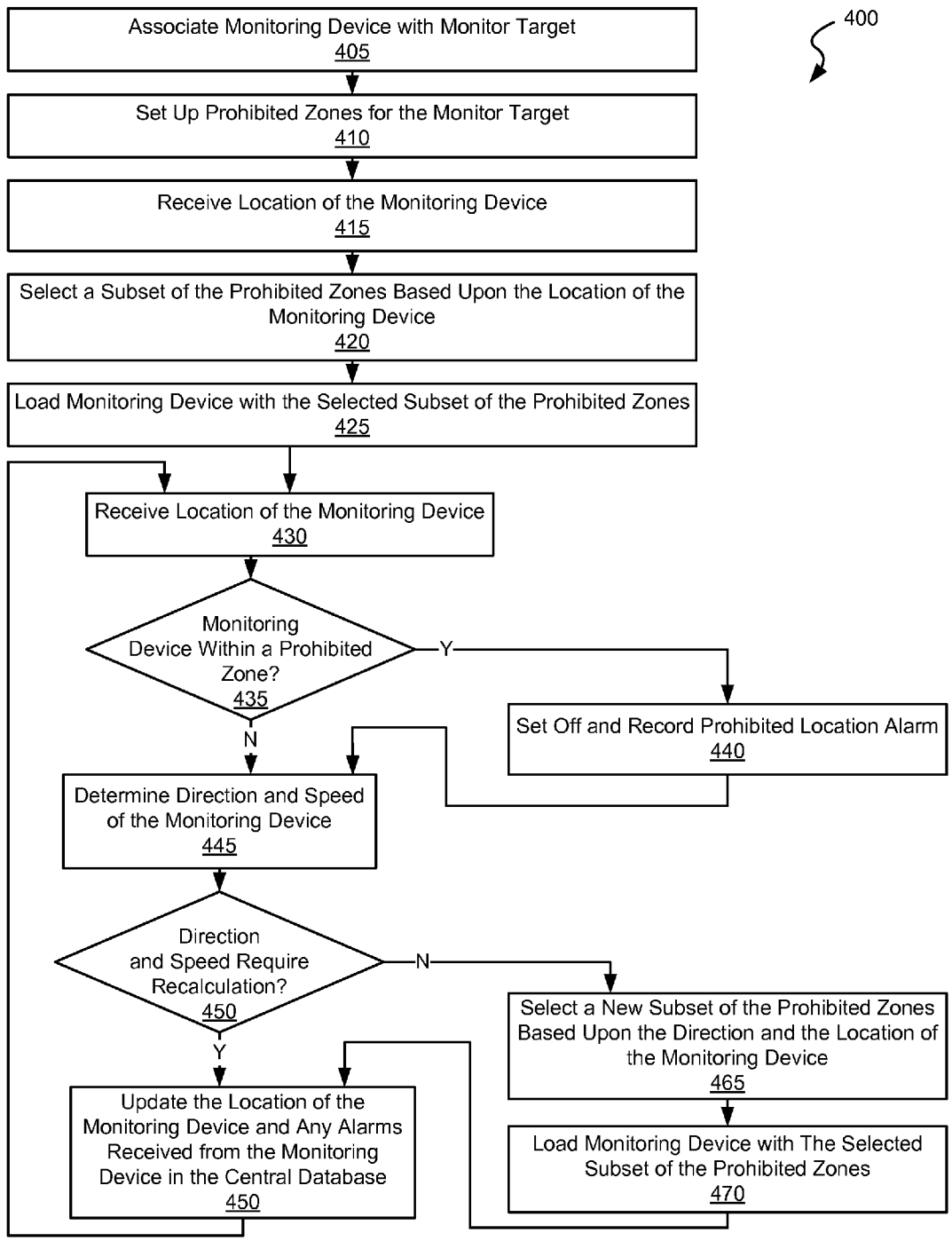
FIG. 4 is a flow diagram depicting another method for adaptive zone updating in accordance with some embodiments of the present invention.

Turning to FIG. 4, a flow diagram 400 depicts another method for adaptive zone updating in accordance with some embodiments of the present invention. Following flow diagram 400, a monitor device is associated with a monitor target (block 405). Where the monitor target is a human subject, associating the monitor device with the monitor target may include placing the monitor device in a pouch maintained by the human subject or physically attaching the monitoring device to the human subject using, for example, a strap or bracelet. Alternatively, where the monitor target is a non-human asset, associating the monitor device with the monitor target may include placing the monitor device inside the target or otherwise attaching the monitor device to the target. Based upon the disclosure provided herein, one of ordinary skill in the art will appreciate a variety of ways that a monitor device may be associated with a target.

Figure 5A:
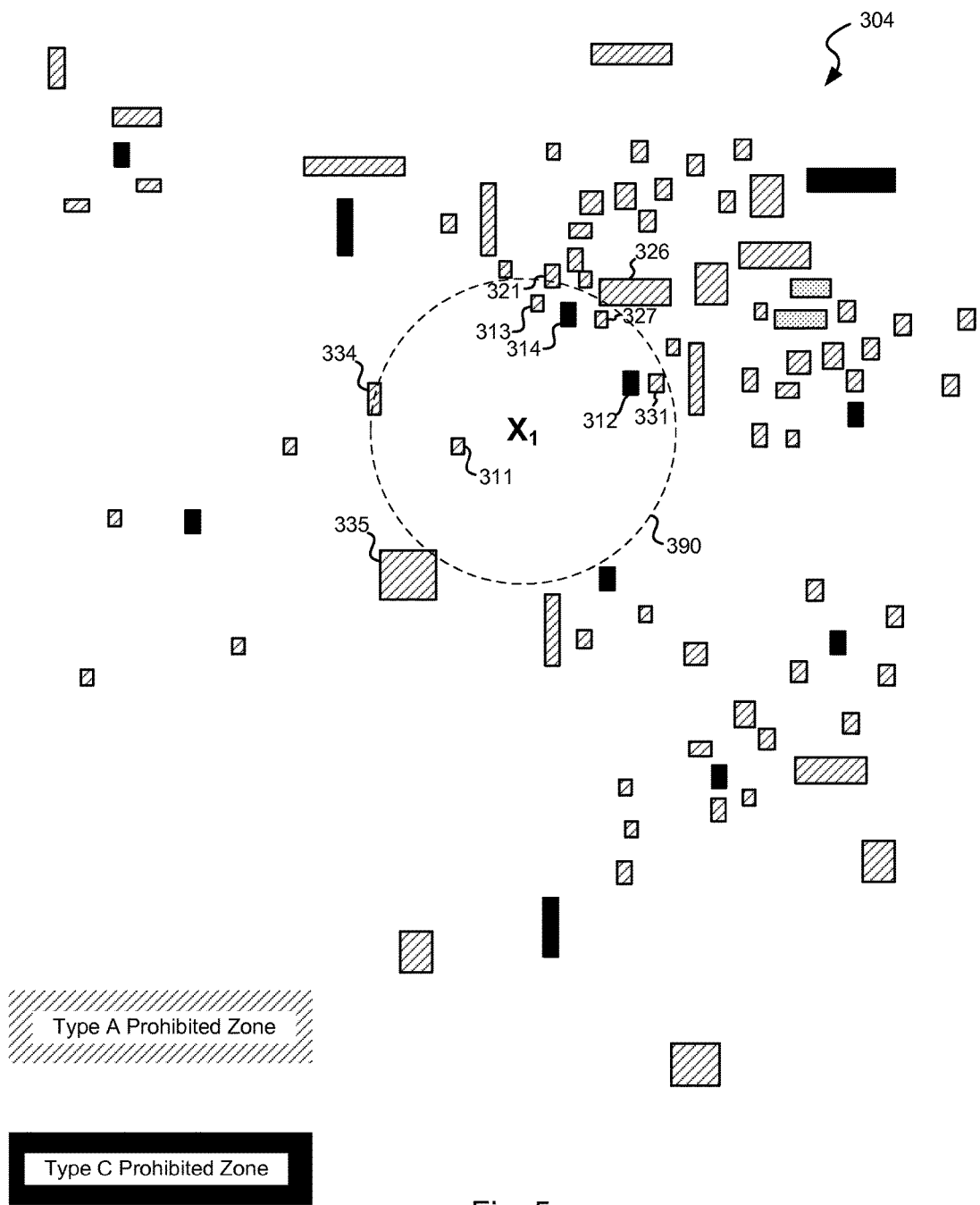
FIGS. 5a-5d provide an example graphical depiction of the method of FIG. 4.

A set of zones or areas into which the target may go is set up (block 410). The prohibited zones may be identified in a number of ways. For example, the prohibited zones may be identified as two opposing corners of a rectangle or a center point and radius of a circle. Based upon the disclosure provided herein, one of ordinary skill in the recognize other approaches that may be used for identifying the boundaries of a prohibited zone. The universe of prohibited zones may be developed, for example, by local area officials to identify the location of different types of zones in a region that they operate. In turn, zone information from a number of local regions may be assembled in a common database to make a wider area map of zones. A location of the monitoring device is received (block 415). In some cases, the location is received by control station 191. As discussed above in relation to FIG. 1, the location may be based upon satellite information or beacon information. The received location is used to fix the position of the monitoring device (and associated target) relative to the prohibited zones identified in block 410 and based upon this relative location of the monitoring device to the identified prohibited zones, a subset of the prohibited zones is selected for the monitoring device (block 420). In some cases where the location is received by control station 191, control station 191, using instructions from accessed from storage medium 195 identifies the selected subset of prohibited zones. As an example, only zones within an area around the location of the monitoring device are included in the subset of prohibited zones. In some cases, the size of the area around the location varies based upon the density of prohibited zones in the area. Thus, where the location of the monitoring device is in an area with a low density of prohibited zones, the area around the location will be larger than that where the monitoring device is in an area with a higher density of prohibited zones. In some cases, the area around the location is of a size that accommodates a defined number of prohibited zones. Turning to FIG. 5a, the location of the monitoring device is identified as $X_1$, and the area around the location of the monitoring device is a circle 390. As shown, ten prohibited zones are at least partially included in circle 390 (prohibited zone 311 of type A, prohibited zone 312 of type C, a prohibited zone 313 of type A, prohibited zone 314 of type C, prohibited zone 321 of type C, prohibited zone 326 of type C, prohibited zone 327 of type C, prohibited zone 331 of type C, prohibited zone 334 of type C, and prohibited zone 335 of type C). In this example, the selected subset of prohibited zones identified using the process of block 420 include prohibited zones 311, 312, 313, 314. 321, 326, 327, 331, 334, 335. Referring again to FIG. 4, the selected subset of prohibited zones is loaded into the monitoring device (block 425). This may include, for example, communicating a load prohibited zones message from control station 191 to the monitoring device. At this point, the monitoring device is initialized for operation.

During post initialization, a location of the monitoring device is again received (block 430). In addition, the monitoring device takes the location information that is being reported to the central monitor and determines whether the monitoring device has moved into a prohibited zone (i.e., one of the subset of the prohibited zones) (block 435). Where the monitoring device determines that it is within a prohibited zone (block 435), the monitoring device communicates this information by setting off and recording a prohibited zone alarm (block 440). This alarm may be, for example, an audible communication to an individual associated with the monitoring device giving instructions on a direction to travel to move outside of the prohibited zone. Based upon the disclosure provided herein, one of ordinary skill in the art will recognize a variety of alarms that may be implemented in relation to different embodiments of the present invention.

Figure 5B:
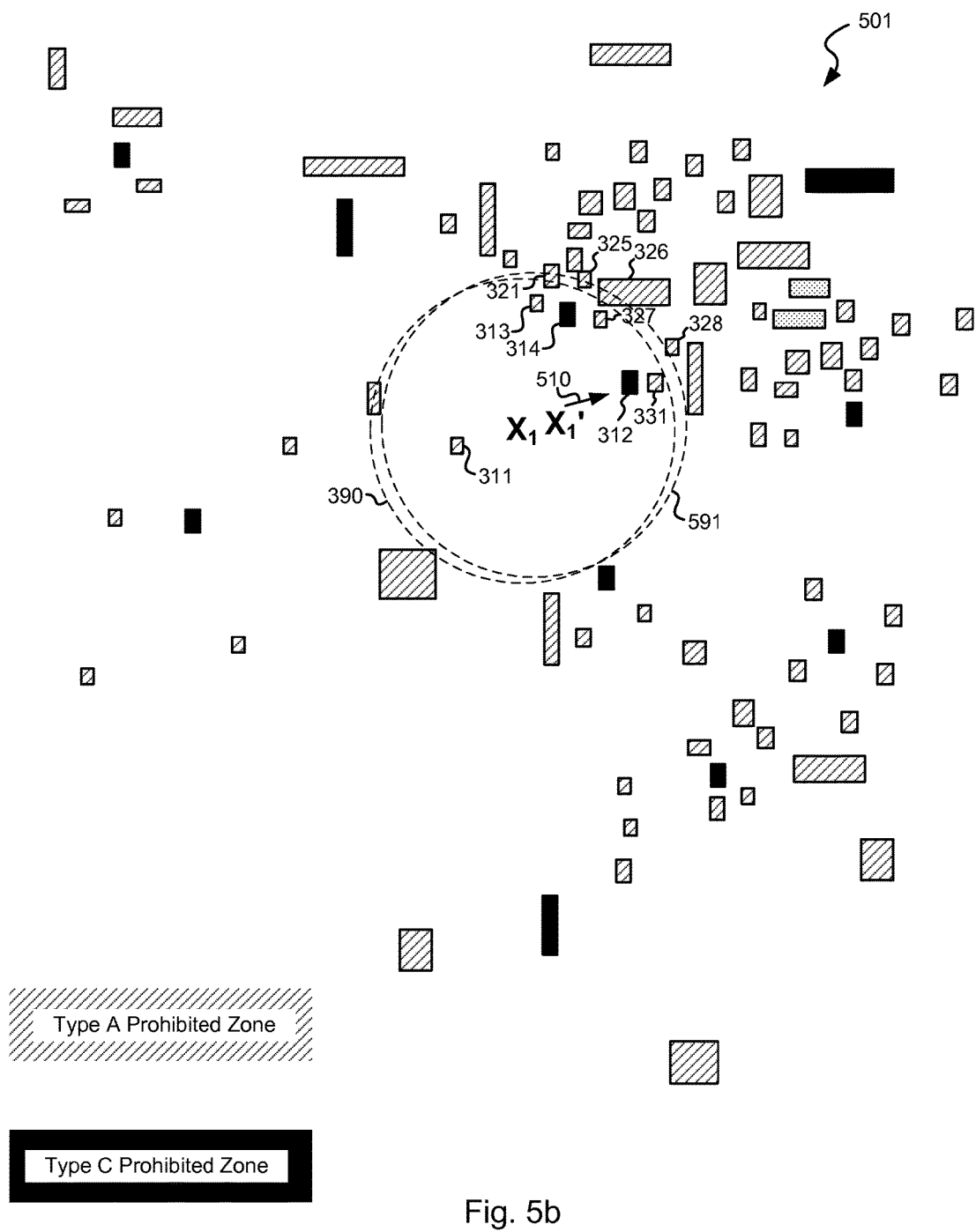

The direction and speed of the monitoring device is determined (block 445). This may be done by the monitoring device using location information generated in the monitoring device, or may be done by control station 191 using successive instances of location information provided from the monitoring device. A new subset of the prohibited zones is then generated based upon the location, direction and speed of the monitoring device. In particular, where the speed is high, the subset of the prohibited zones may be projected farther into the future along a path extending in the direction than if a lower speed occurs. This direction and speed information is used to determine whether recalculation is needed (block 45). Recalculation is needed when the monitoring device is within a defined period of time (e.g., t seconds) from leaving the area surrounding the current subset of prohibited zones, and thus a new subset of prohibited zones is needed by the monitoring device to reflect is new location. Turning to FIG. 5b, the location of the monitoring device is identified as $X_1'$ and the area around the location of the monitoring device is a circle 591. Of note, the difference between $X_1$ (i.e., a previous location of the monitoring device) and $X_1'$ represents a movement in a particular direction and a particular speed (both represented by an arrow 510) that necessitates an update of the subset of prohibited zones. In this case, the newly determined subset of prohibited zones includes ten prohibited zones at least partially within circle 591 (prohibited zone 311 of type A, prohibited zone 312 of type C, prohibited zone 313 of type A, prohibited zone 314 of type C, prohibited zone 321 of type A, prohibited zone 325 of type A, prohibited zone 326 of type A, prohibited zone 327 of type A, prohibited zone 328 of type A, and prohibited zone 331 of type A). In this example, the selected subset of prohibited zones identified using the process of block 465 include prohibited zones 311, 312, 313, 314, 321, 325, 326, 327, 328, 331.

Figure 5C:
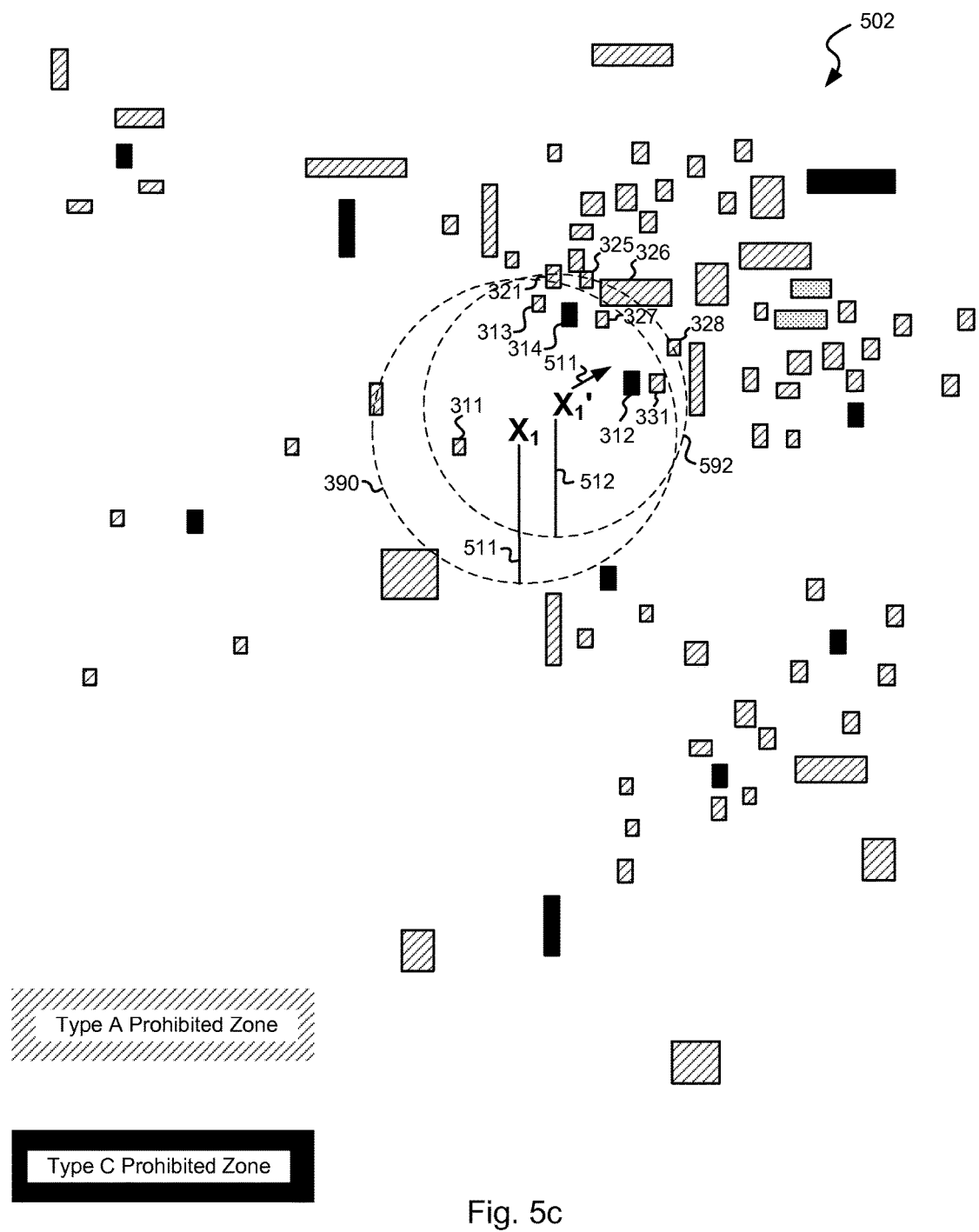
Figure 5D:
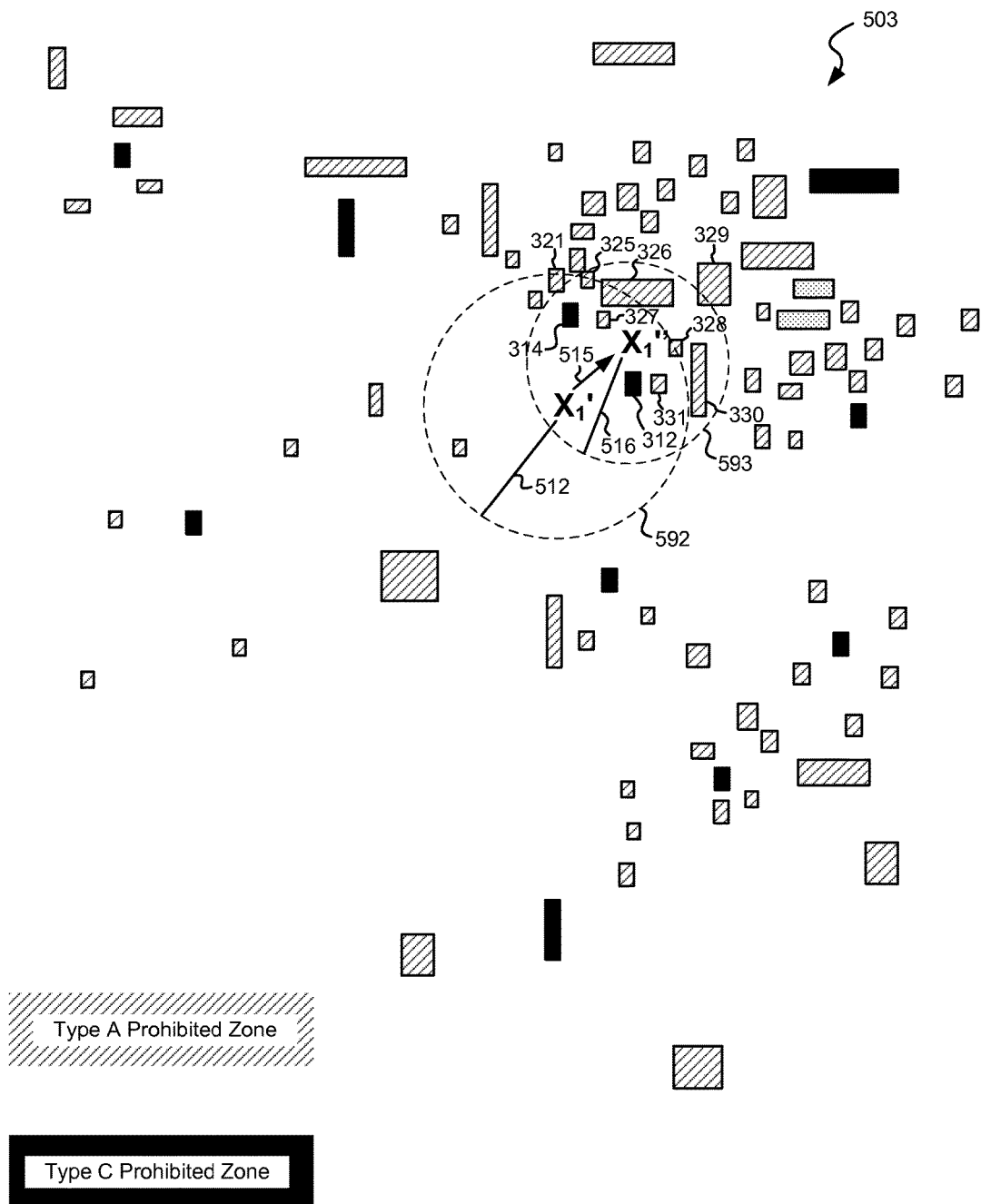

Referring to FIGS. 5c and 5d, examples of varying the area around the location of the monitoring device to control the number of prohibited zones included in the selected subset of prohibited zones are shown. First, a map 502 of FIG. 5c shows an example map 502 where the location of the monitoring device is identified as $X_1'$ and the area around the location of the monitoring device is a circle 592. Of note, the difference between $X_1$ (i.e., a previous location of the monitoring device) and $X_1'$ represents a movement in a particular direction and a particular speed (both represented by an arrow 511) that necessitates an update of the subset of prohibited zones. In this case, the newly determined subset of prohibited zones includes ten prohibited zones at least partially within circle 592 (prohibited zone 311 of type A, prohibited zone 312 of type C, prohibited zone 313 of type A, prohibited zone 314 of type C, prohibited zone 321 of type A, prohibited zone 325 of type A, prohibited zone 326 of type A, prohibited zone 327 of type A, prohibited zone 328 of type A, and prohibited zone 331 of type A). In this example, the selected subset of prohibited zones identified using the process of block 465 include prohibited zones 311, 312, 313, 314, 321, 325, 326, 327, 328, 331. Also of note, the area of circle 592 is less than the area of circle 592 as the monitoring device is moving to a location ($X_1'$) surrounded by a higher density of prohibited zones when compared with the density of prohibited zones around the previous location ($X_1$) of the monitoring device. The areas of circles 390, 592 are represented as radii 511, 512, respectively. Because the density of prohibited zones is greater in one area than another, the larger circle 390 encompasses the same number of prohibited zones as the smaller circle 592. Thus, the area around the monitoring device varies to encompass the same number of prohibited zones.

Second, a map 503 of FIG. 5d shows another example map 503 where the location of the monitoring device is identified as $X_1''$ and the area around the location of the monitoring device is a circle 593. Of note, the difference between $X_1'$ (i.e., a previous location of the monitoring device) and $X_1''$ represents a movement in a particular direction and a particular speed (both represented by an arrow 515) that necessitates an update of the subset of prohibited zones. In this case, the newly determined subset of prohibited zones includes ten prohibited zones at least partially within circle 593 (prohibited zone 312 of type C, prohibited zone 314 of type C, prohibited zone 321 of type A, prohibited zone 325 of type A, prohibited zone 326 of type A, prohibited zone 327 of type A, prohibited zone 328 of type A, a prohibited zone 329 of type A, a prohibited zone 330 of type A, and prohibited zone 331 of type A). In this example, the selected subset of prohibited zones identified using the process of block 465 include prohibited zones 312, 314, 321, 325, 326, 327, 328, 329, 330, 331. Also of note, the area of circle 593 is less than the area of circle 592 as the monitoring device is moving to a location ($X_1''$) surrounded by a higher density of prohibited zones when compared with the density of prohibited zones around the previous location ($X_1'$) of the monitoring device. The areas of circles 592, 593 are represented as radii 512, 516, respectively. Again, because the density of prohibited zones is greater in one area than another, the larger circle 592 encompasses the same number of prohibited zones as the smaller circle 593. Thus, the area around the monitoring device varies to encompass the same number of prohibited zones.

Referring again to FIG. 4, the newly selected subset of prohibited zones is loaded into the monitoring device (block 470). This may include, for example, communicating a load prohibited zones message from control station 191 to the monitoring device. The location of the monitoring device and any alarms from the monitoring device are updated in the central memory (block 450). This may be done, for example, by central monitoring system 160, and where any alerts are desired (e.g., a violation of a prohibited zone) they are provided to alert system 185. At this juncture, the processes of blocks 430-470 are repeated for the next reported location of the monitoring device.

Figure 6:
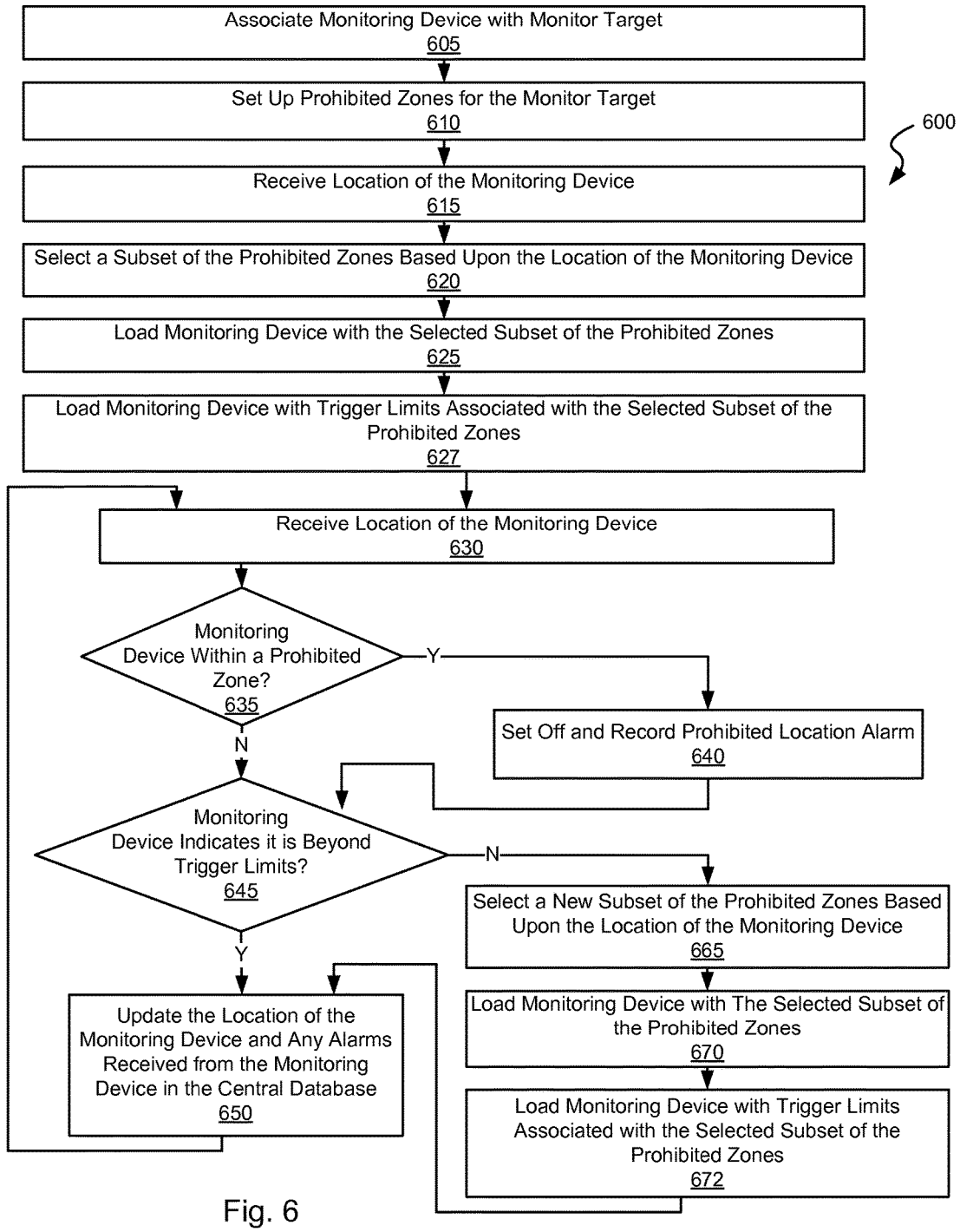
FIG. 6 is a flow diagram depicting yet another method for adaptive zone updating in accordance with some embodiments of the present invention.

Turning to FIG. 6, a flow diagram 600 depicts yet another method for adaptive zone updating in accordance with some embodiments of the present invention. Following flow diagram 600, a monitor device is associated with a monitor target (block 605). Where the monitor target is a human subject, associating the monitor device with the monitor target may include placing the monitor device in a pouch maintained by the human subject or physically attaching the monitoring device to the human subject using, for example, a strap or bracelet. Alternatively, where the monitor target is a non-human asset, associating the monitor device with the monitor target may include placing the monitor device inside the target or otherwise attaching the monitoring device to the target. Based upon the disclosure provided herein, one of ordinary skill in the art will appreciate a variety of ways that a monitor device may be associated with a target.

A set of zones or areas into which the target may go is set up (block 610). The prohibited zones may be identified in a number of ways. For example, the prohibited zones may be identified as two opposing corners of a rectangle or a center point and radius of a circle. Based upon the disclosure provided herein, one of ordinary skill in the recognize other approaches that may be used for identifying the boundaries of a prohibited zone. The universe of prohibited zones may be developed, for example, by local area officials to identify the location of different types of zones in a region that they operate. In turn, zone information from a number of local regions may be assembled in a common database to make a wider area map of zones. A location of the monitoring device is received (block 615). In some cases, the location is received by control station 191. As discussed above in relation to FIG. 1, the location may be based upon satellite information or beacon information. The received location is used to fix the position of the monitoring device (and associated target) relative to the prohibited zones identified in block 610 and based upon this relative location of the monitoring device to the identified prohibited zones, a subset of the prohibited zones is selected for the monitoring device (block 620). In some cases where the location is received by control station 191, control station 191, using instructions from accessed from storage medium 195 identifies the selected subset of prohibited zones. As an example, only zones within an area around the location of the monitoring device are included in the subset of prohibited zones.

In some cases, the size of the area around the location varies based upon the density of prohibited zones in the area. Thus, where the location of the monitoring device is in an area with a low density of prohibited zones, the area around the location will be larger than that where the monitoring device is in an area with a higher density of prohibited zones. In some cases, the area around the location is of a size that accommodates a defined number of prohibited zones. In other cases, the area surrounding the location of the monitoring device is fixed and therefore encompasses a varying number of prohibited zones. In yet other cases, both the area surrounding the location of the monitoring device from which the subset of the prohibited zones are selected and the number of prohibited zones that may be included in the subset of the prohibited zones may vary.

In addition to loading the subset of the prohibited zones into the monitoring device, trigger limits associated with the selected subset of the prohibited zones is also loaded into the monitoring device (block 627). The trigger limits may be, for example, a certain distance of movement away from a monitoring device location that was the basis for selecting the previous subset of prohibited zones. As another example, the trigger limit may be a rate and direction of movement relative to a boundary of the current subset of prohibited zones (e.g., a rate and direction of movement relative to the edge of circle 390 of FIG. 5c). As yet another example, the trigger limit may be an expected time in seconds until the monitoring device is expected to exceed the boundary of the current subset of prohibited zones, where the time is calculated based on the rate and direction of movement of the monitoring device relative to a boundary of the current subset of prohibited zones. As yet another example, the trigger limit may be a time since the last subset of prohibited zones were loaded to the monitoring device. Based upon the disclosure provided herein, one of ordinary skill in the art will recognize a variety of trigger limits that may be used in relation to different embodiments of the present invention.

During post initialization, a location of the monitoring device is again received (block 630). In addition, the monitoring device takes the location information that is being reported to the central monitor and determines whether the monitoring device has moved into a prohibited zone (i.e., one of the subset of the prohibited zones) (block 635). Where the monitoring device determines that it is within a prohibited zone (block 635), the monitoring device communicates this information by setting off and recording a prohibited zone alarm (block 640). This alarm may be, for example, an audible communication to an individual associated with the monitoring device giving instructions on a direction to travel to move outside of the prohibited zone. Based upon the disclosure provided herein, one of ordinary skill in the art will recognize a variety of alarms that may be implemented in relation to different embodiments of the present invention.

It is then determined whether the monitoring device indicates that it is beyond the trigger limits (block 645). Where, for example, where the trigger limit is a certain distance of movement away from a monitoring device location that was the basis for selecting the previous subset of prohibited zones, the determination of exceeding the trigger limits includes whether the current location of the monitoring device is a distance from an earlier monitoring device location that is greater than the trigger limit. Alternatively, for example, where the trigger limit is an expected time in seconds until the monitoring device is expected to exceed the boundary of the current subset of prohibited zones, the determination of exceeding the trigger limits includes whether the current speed and direction will have the monitoring device will go beyond the boundary of the current subset of prohibited zones within a time less than the trigger limit. Where the monitoring device indicates that it is beyond the trigger limits (block 645), a new subset of the prohibited zones based upon the current location of the monitoring device is determined (block 665). This may be done, for example, by control station 191. In such a case, control station 191, using instructions from accessed from storage medium 195, identifies the selected subset of prohibited zones. As an example, only zones within an area around the updated location of the monitoring device are included in the subset of prohibited zones. The newly selected subset of prohibited zones is loaded into the monitoring device along with a new set of trigger limits corresponding to the newly selected subset of the prohibited zones (block 670). This may include, for example, communicating a load prohibited zones message from control station 191 to the monitoring device.

The location of the monitoring device and any alarms from the monitoring device are updated in the central memory (block 650). This may be done, for example, by central monitoring system 160, and where any alerts are desired (e.g., a violation of a prohibited zone) they are provided to alert system 185. At this juncture, the processes of blocks 630-670 are repeated for the next reported location of the monitoring device.

In conclusion, the present invention provides for novel systems, devices, and methods for monitoring individuals and/or assets. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A monitoring system, the monitoring system comprising:
   a monitoring device associated with a monitor target;
   a database operable to store a number of prohibited zones; and
   wherein the system is operable to:
      receive a first location of the monitoring device;
      identify a first subset of the number of prohibited zones within a first range of the first location;
      store the first subset to the monitoring device;
      receive a second location of the monitoring device;
      identify a second subset of the number of prohibited zones within a second range of the second location; and
      store the second subset to the monitoring device when the second location is within a defined distance to an edge of the first range.

2. The monitoring system of claim 1, wherein the monitor target is a human.

3. The monitoring system of claim 2, wherein the monitoring device includes a strap operable to attach the monitoring device to the human using a strap.

4. The monitoring system of claim 1, wherein the number of prohibited zones stored by the database are of at least a first zone type, a second zone type and a third zone type; and wherein the monitor target is prohibited from entering areas identified as the second zone type or the first zone type; and wherein the monitor target is allowed to enter areas identified as the third zone type.

5. The monitoring system of claim 4, wherein the system is further operable to:
    identify a third subset of the number of prohibited zones of the second zone type based upon the first location;
    store the third subset to the monitoring device in addition to the first subset;
    receive a second location of the monitoring device;
    identify a fourth subset of the number of prohibited zones of the zone type based upon the second location; and
    store the fourth subset to the monitoring device when the second location is within the defined distance to the edge of the first range.

6. The monitoring system of claim 1, the monitoring system further comprising:
    a central system, wherein the central system is operable to:
        receive the first location of the monitoring device;
        identify the first subset of the number of prohibited zones based upon the first location;
        transfer the first subset to the monitoring device;
        receive the second location of the monitoring device;
        identify a second subset of the number of prohibited zones based upon the second location; and
        transfer the second subset to the monitoring device.

7. The monitoring system of claim 1, wherein the monitoring system is further operable to:
    receive a direction of the monitoring device corresponding to the first location; and
    wherein identifying the first subset is based both upon the first location and the direction.

8. The monitoring system of claim 1, wherein the monitoring system is further operable to:
    receive a velocity of the monitoring device; and
    wherein the defined distance to the edge of the first range is based both upon the second location and the velocity.

9. The monitoring system of claim 1, wherein a number of prohibited zones in the first subset is the same as a number of zones in the second subset.

10. The monitoring system of claim 9, wherein an area corresponding to the first range is different than an area corresponding to the second range.

11. The monitoring system of claim 1, wherein an area corresponding to the first range is the same size as an area corresponding to the second range.

12. The monitoring system of claim 1, wherein the monitoring device is operable to:
    identify a third location of the monitoring device;
    determine that the third location is within an area identified as one of the first subset of the number of prohibited zones; and
    provide an alarm based upon the monitoring device being within the area.

13. The monitoring system of claim 12, wherein providing the alarm includes performing an operation selected from a group consisting of: transmitting an alarm to a central monitoring system, and issuing an audible alarm to the monitor target.

14. The monitoring system of claim 1, wherein the monitor target is prohibited from entering areas identified as a particular zone type, and wherein the particular zone type is selected from a group consisting of: a school zone, a zone where alcohol is dispensed or sold, a freeway zone, and a residential area zone.

15. A monitoring device, the monitoring device comprising:
    a location monitoring system operable to indicate movement of the monitoring device to a central monitor;
    a connection device operable to attach to a human monitor target;
    a zone memory;
    a prohibited zone monitoring system operable to:
        receive a first location from the location monitoring system and a second location from the location monitoring system;
        determine whether the first location is within a first subset of zones, wherein the first subset of zones indicates a first set of prohibited zones determined based upon a third location and stored by the prohibited zone monitoring system to the zone memory;
        determine whether the second location is within a second subset of zones, wherein the second subset of zones indicates a second set of prohibited zones determined based upon a fourth location and stored by the prohibited zone monitoring system to the zone memory; and
        wherein only one of the first subset of zones or the second subset of zones is stored in the zone memory.

16. The monitoring device of claim 15, wherein the location monitoring system is further operable to determine a direction corresponding to the third location, and wherein the first set of prohibited zones determined based upon both the direction and the third location.

17. The monitoring device of claim 15, wherein the location monitoring system is further operable to determine a velocity of the monitoring, and wherein the first set of prohibited zones determined based upon both the velocity and the third location.

18. The monitoring device of claim 15, wherein a number of zones in the first subset is the same as a number of zones in the second subset.

19. The monitoring device of claim 18, wherein an area including the number of zones in the first subset is different than an area including the number of zones in the second subset.

20. The monitoring device of claim 15, wherein an area including the first subset is the same size as an area including the second subset.

21. A method for prohibited zone monitoring, the method comprising:
    receiving a first location of a monitoring device;
    receiving a second location of the monitoring device;
    storing a number of zones, wherein the zones are of at least a zone type, wherein the monitoring device is prohibited from entering an area of the zone type;
    identifying a first subset of the number of zones of the zone type within a first range of the first location;
    storing the first subset to the monitoring device;
    identifying a second subset of the number of zones of the zone type within a second range of the second location; and
    storing the second subset to the monitoring device when the second location is within a defined distance to an edge of the first range.

* * * * *